(12) United States Patent
Martineau et al.

(10) Patent No.: US 10,999,264 B2
(45) Date of Patent: May 4, 2021

(54) GENERATING A DEVICE IDENTIFICATION KEY FROM A BASE KEY FOR AUTHENTICATION WITH A NETWORK

(71) Applicant: CRYPTOGRAPHY RESEARCH, INC., Sunnyvale, CA (US)

(72) Inventors: Philippe Alain Martineau, Saint Paul lez Durance (FR); Ambuj Kumar, Sunnyvale, CA (US); William Craig Rawlings, Saratoga, CA (US)

(73) Assignee: Cryptography Research, Inc., San Jose, CA (US)

( * ) Notice: Subject to any disclaimer, the term of this patent is extended or adjusted under 35 U.S.C. 154(b) by 98 days.

(21) Appl. No.: 15/507,638

(22) PCT Filed: Aug. 24, 2015

(86) PCT No.: PCT/US2015/046592
§ 371 (c)(1),
(2) Date: Feb. 28, 2017

(87) PCT Pub. No.: WO2016/032975
PCT Pub. Date: Mar. 3, 2016

(65) Prior Publication Data
US 2017/0250967 A1    Aug. 31, 2017

Related U.S. Application Data

(60) Provisional application No. 62/160,297, filed on May 12, 2015, provisional application No. 62/043,179, filed on Aug. 28, 2014.

(51) Int. Cl.
*H04L 29/06* (2006.01)
*H04W 12/06* (2021.01)
(Continued)

(52) U.S. Cl.
CPC .......... *H04L 63/061* (2013.01); *H04L 9/0866* (2013.01); *H04L 9/0869* (2013.01);
(Continued)

(58) Field of Classification Search
CPC ... H04L 9/0866; H04L 9/3271; H04L 63/061; H04L 63/0853; H04L 9/0869;
(Continued)

(56) References Cited

U.S. PATENT DOCUMENTS 8,316,237 B1 * 11/2012 Felsher ................ H04L 9/0825
380/282
2008/0212771 A1 * 9/2008 Hauser ................ G06F 21/305
380/44
(Continued)

FOREIGN PATENT DOCUMENTS

WO    2008083363 A1    7/2008
WO    2010045426 A1    4/2010
(Continued)

OTHER PUBLICATIONS

ISA/US, "International Search Report and the Written Opinion of the International Searching Authority" for International Patent Application No. PCT/US15/46592, dated Nov. 12, 2015, pp. 1-11.
(Continued)

*Primary Examiner* — Izunna Okeke
(74) *Attorney, Agent, or Firm* — Lowenstein Sandler LLP (57) ABSTRACT

A base key that is stored at a device may be received. A network identification may further be received. A device identification key may be generated based on a combination of the network identification and the base key. Furthermore, the device identification key may be used to authenticate the device with a network that corresponds to the network identification.

20 Claims, 8 Drawing Sheets

(51) Int. Cl.
  *H04L 9/08* (2006.01)
  *H04L 9/32* (2006.01)
  *H04W 12/00* (2021.01)
  *H04W 12/04* (2021.01)
(52) U.S. Cl.
  CPC ........ *H04L 9/3271* (2013.01); *H04L 63/0853* (2013.01); *H04W 12/003* (2019.01); *H04W 12/04* (2013.01); *H04W 12/06* (2013.01); H04L 2209/80 (2013.01); H04L 2463/061 (2013.01)
(58) Field of Classification Search
  CPC ......... H04L 2209/80; H04L 2463/061; H04W 12/06; H04W 12/04
  See application file for complete search history.

(56) References Cited

U.S. PATENT DOCUMENTS

| | | | |
|---|---|---|---|
| 2010/0100946 A1* | 4/2010 | Hallam-Baker | H04L 63/08 726/5 |
| 2010/0248720 A1* | 9/2010 | Millet | H04W 12/06 455/435.1 |
| 2011/0107099 A1* | 5/2011 | Pan | H04L 63/0807 713/169 |
| 2013/0012168 A1 | 1/2013 | Rajadurai et al. | |
| 2013/0219477 A1* | 8/2013 | Hallam-Baker | H04L 63/08 726/5 |
| 2013/0303122 A1 | 11/2013 | Li et al. | |
| 2013/0340040 A1 | 12/2013 | Park et al. | |
| 2014/0003604 A1 | 1/2014 | Campagna et al. | |
| 2014/0099925 A1 | 4/2014 | Schell et al. | |
| 2014/0140507 A1 | 5/2014 | Park et al. | |
| 2015/0244692 A1* | 8/2015 | Liu | H04W 12/04 713/168 |
| 2015/0257083 A1* | 9/2015 | Kim | H04L 41/0803 370/254 |
| 2015/0373560 A1* | 12/2015 | Chu | H04W 24/02 370/252 |

FOREIGN PATENT DOCUMENTS

| | | |
|---|---|---|
| WO | WO-2014-025829 A2 | 2/2014 |
| WO | 2014036689 A1 | 3/2014 |
| WO | WO-2014-035851 A2 | 3/2014 |

OTHER PUBLICATIONS

Notification Concerning Transmittal of International Preliminary Report on Patentability dated Mar. 9, 2017 re: Int'l Appln. No. PCT/US15/046692. 8 Pages.

Park, Jaemin et al., "Secure Profile Provisioning Architecture for Embedded UICC", 2013 Eighth International Conference on Availability, Reliability and Security, Sep. 2-6, 2013, pp. 297-303. 7 pages.

\* cited by examiner

GENERATING A DEVICE IDENTIFICATION KEY FROM A BASE KEY FOR AUTHENTICATION WITH A NETWORK

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure relate to the generation of a device identification key from a base key for authentication with a network. The device identification may be generated from the base key that is stored on a device and may subsequently be used to authenticate the device with a network. As an example, the network may correspond to a cellular or mobile network and the device may correspond to a mobile communications device (e.g., a cellular phone or smartphone). The device identification key may be derived or generated by the mobile communications device and the device identification key, or other data based on the device identification key, may subsequently be transmitted to a node or endpoint of the cellular network (e.g., a cellular tower) to authenticate the mobile communications device for use with the cellular network.

The generation of the device identification key may correspond to functionality of a subscriber identity module or a subscriber identification module (SIM) card that is used in a mobile communications device. The SIM card may store an international mobile subscriber identity (IMSI) and an authentication key ($K_i$) that is used to identify and authenticate subscribers of a mobile network from the mobile communications device. For example, upon an initialization or powering on of the mobile communications device, the IMSI stored on a SIM card may be transmitted to a network operator of a network. The network operator may generate a proof (e.g., a cryptographic value) based on a generated value (i.e., a cryptographic challenge) and an authentication key that is known by the network operator to correspond to the received IMSI. Furthermore, the network operator may transmit the generated value to the mobile communications device, which may subsequently generate another proof based on the authentication key that is stored on the SIM card and the generated value received from the network operator. The mobile communications device may transmit its generated proof to the network operator, which may compare its generated proof with the proof generated by the mobile communications device. If the two proofs match, then the mobile communications device may be considered to be successfully authenticated for use with the mobile network.

The use of a SIM card with a mobile communications device may require additional area for an integrated circuit of the mobile communications device as well as provide limited data storage capacity. Instead of using a SIM card, the functionality of the SIM card may be provided without significant additional hardware, discrete components, or additional circuitry within the mobile communications device. For example, an existing processor (e.g., a baseband processor or an application processor) that is within the mobile communications device may be enabled to provide functionality of the SIM card. The processor may retrieve a base key with a Root of Trust (RoT) that is a set of functions within the processor that is trusted by the mobile communications device. The retrieved base key may be combined with other values (e.g., a device identifier, a network identifier, etc.) to generate a device identification key that corresponds to the authentication key ($K_i$). For example, the base key may be combined with a network identifier to generate the device identification key that is then transmitted to a network operator corresponding to the network identifier that is used to generate the device identification key. For example, the device identification key may be transmitted over a secure side channel or communications link. The device identification key may then be used to authenticate the mobile communications device with the mobile network.

Furthermore, the use of the hardware RoT to generate the device identification may allow for the generation of multiple device identification keys. For example, the hardware RoT may store one base key and multiple network IDs where each network ID may correspond to a different mobile network. When the mobile communications device attempts to connect to a first mobile network, then a first device identification key may be generated based on a combination of the base key and a first network identification. If the mobile communications device attempts to connect to a second mobile network, then a second device identification key may then be generated based on a combination of the same base key and a second network identification. As such, a single base key that is stored in the mobile communications device may be used to generate different device identification keys.

Aspects of the present disclosure provide the functionality of a SIM card or other such identification applications to authenticate a device with another entity (e.g., a network). The utilization of a hardware RoT to store a base key that is used to generate multiple device identification keys may result in less circuitry, lower power consumption, and less storage space as only the base key may be stored in the device.

Figure 1:
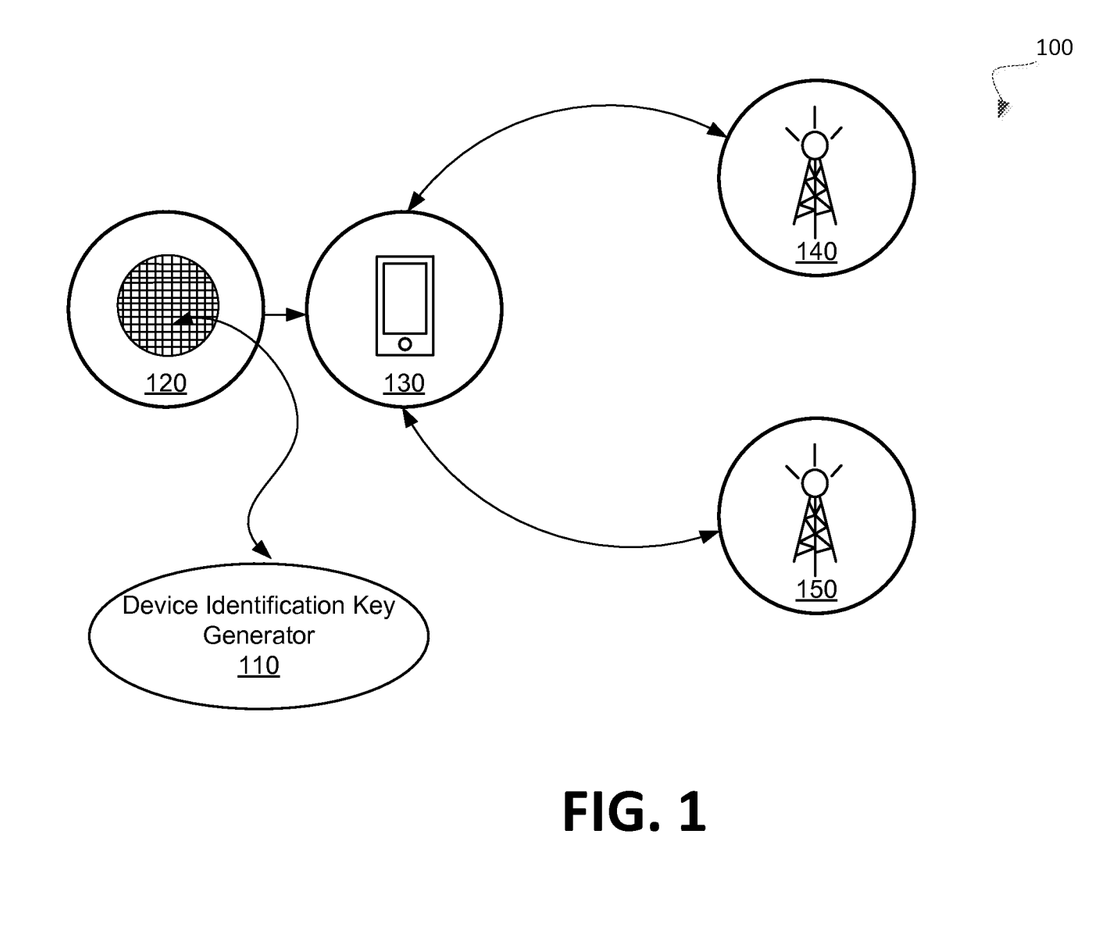
FIG. 1 illustrates an example environment with an integrated circuit including a device identification key generator in accordance with some embodiments of the present disclosure.

FIG. 1 illustrates an example environment 100 with an integrated circuit including a device identification key generator. In general, the example environment 100 illustrates the use of a base key that is stored at a device (e.g., a mobile communications device) to be used to authenticate the device with one or more network operators of one or more networks.

As shown in FIG. 1, the environment 100 illustrates a lifecycle of an integrated circuit at various times. For example, a first entity 120 may be a manufacturing entity that manufactures an integrated circuit (e.g., an application processor or a baseband processor) that includes a device identification key generator 110 generates a device identification key. The integrated circuit may include a device key identification generator 110 that may be used to generate a device identification key from a base key. In some embodiments, the first entity 120 may store the base key in a one-time programmable (OTP) memory, a netlist (e.g., a connectivity of the component terminals of the integrated circuit), or a combination of the OTP memory and the netlist, or any other storage device on the integrated circuit at the time of manufacture or fabrication, packaging of the integrated circuit, or another stage in the manufacturing processes associated with the integrated circuit. The first entity 120 may further store additional information (e.g., a network identifier) in the integrated circuit that may further be used to generate the device identification key.

A second entity 130 may be a device manufacturer that includes or incorporates the integrated circuit into an electronics device. The device (e.g., a mobile communications device) that includes the integrated circuit with the device identification key generator 110 may use the device identification key that is generated to authenticate the device with a network. Since the first entity 120 programs the base key into the integrated circuit that is used to generate the device identification key, the second entity 130 may not be aware of the contents of the base key. Thus, the first entity or another entity (e.g., a network operator) may be assured that the base key that is used to generate or derive the device identification key is secure and private (e.g., no other entity is aware of the contents of the base key).

The device manufactured by the second entity 130 may interact with one or more networks 140 and/or 150. For example, as previously described, the device may be a mobile communications device that interacts with or uses the networks 140 or 150 (e.g., mobile networks) for communication with other devices. When the mobile communications device attempts to use one of the networks 140 or 150 (e.g. a service provider or mobile network), then the device may transmit the device identification key (or another value based on the device identification key) generated by the device identification key generator 110 of the integrated circuit to a network operator of the networks 140 or 150. For example, when the mobile communications device attempts to connect to the network 140 (e.g., after a powering on of the mobile communications device), then a first device identification key may be generated based on the base key stored in the integrated circuit and transmitted (or another value based on the first device identification key may be transmitted) to a network operator of the network 140. In some embodiments, the device identification key may be transmitted to the network operator over a separate communications link or side channel as described in further detail in conjunction with FIG. 3. Subsequently, if the device attempts to connect to the network 150, then a second device identification key may be generated based on the base key and transmitted (or another value based on the second identification device key may be transmitted) to the network operator of the network 150. The device identification key, or a value based on the device identification key, may be used to authenticate the device with the networks 140 or 150. In some embodiments, if the device successfully authenticates with a network, then the device may use the network to communicate with another device. However, if the device does not successfully authenticate with the network, then the device may not use the network to communicate with another device.

As such, the device identification key generator 110 may be used to generate or derive separate device identification keys for different networks to authenticate a device that includes the device identification key generator 110 with the corresponding network.

Figure 2:
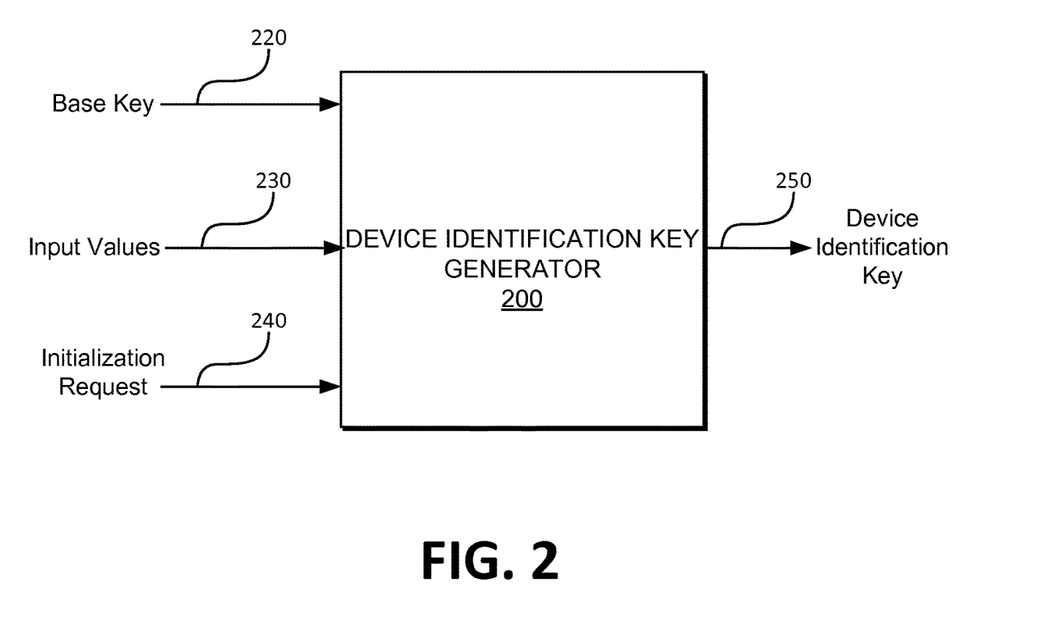
FIG. 2 is a block diagram of an example device identification key generator in accordance with some embodiments.

FIG. 2 is a block diagram of an example device identification key generator 200. In general, the device identification key generator 200 may correspond to the device identification key generator 110 of FIG. 1. The device identification key generator 200 may be used in a device to authenticate the device with a network from a device identification key that is based on a combination of a base key and additional input values.

As shown in FIG. 2, the device identification key generator 200 may receive a base key 220. The base key 220 may be received from an OTP memory, a netlist, or a combination of the OTP memory and the netlist of a device that includes the device identification key generator 200. In some embodiments, the base key 220 may be a unique key that has been stored at the device and that is not shared by any other device that includes another device identification key generator 200. For example, the base key 220 may be a value that is unique to the device such that another device stores a base key at a different value.

The device identification key generator 200 may further receive input values 230 and an initialization request 240. The input values 230 may include various values that are used to be combined with the base key 220 for generating the device identification key 250. For example, a combination of the base key 220 and an input value 230 corresponding to a first network may be used to generate a first device identification key and a combination of the base key 220 and an input value 230 corresponding to a second network may be used to generate a second device identification key.

The initialization request 240 may initiate the generation of the device identification key 250. For example, in response to a powering up or a request to access a network by a device, the device identification key generator 200 may receive the initialization request 240 to initiate the generation of the device identification key 250 based on the input values 230 and the base key 220.

Figure 3:
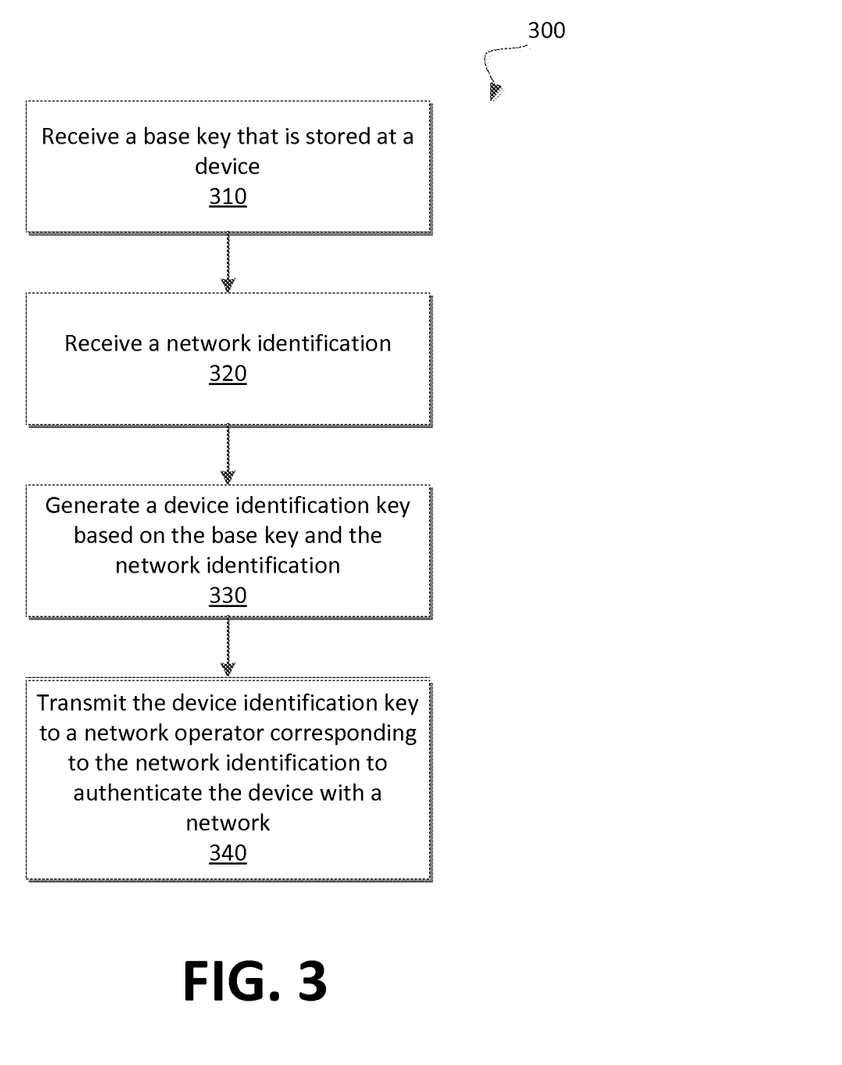
FIG. 3 is a flow diagram of an example method to generate a device identification key in accordance with some embodiments.

FIG. 3 is a flow diagram of an example method 300 to generate a device identification key. In general, the method 300 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 300 may be performed by the device identification key generator 200 of FIG. 2 or the device identification key generator 110 of FIG. 1.

As shown in FIG. 3, the method 300 may begin with the processing logic receiving a base key that is stored at a device (block 310). The processing logic may further receive a network identification (block 320). In some embodiments, the network identification may correspond to a network to which the device is attempting to connect to for communication with another device over the network. The processing logic may further generate a device identification key based on the base key and the network identification (block 330).

For example, the device identification key may be generated by a combination of the base key with the network identification or performing an operation between the base key and the network identification. Furthermore, the processing logic may transmit the device identification key to a network operator corresponding to the network identification for authenticating the device with the network (block 340). For example, the device identification key may be transmitted to a cellular tower or another device or entity (e.g. a server) of a mobile network to authenticate a mobile communications device with the mobile network. In alternative embodiments, another value that is based on the device identification key may be transmitted to the cellular tower of the mobile network to authenticate the mobile communications device with the mobile network.

In some embodiments, the device identification key or another value may be transmitted to the mobile network via a second communications link or channel that is different than the communications link that the mobile communications device would use to communicate with other devices over the mobile network. For example, the device identification key may be transmitted to the mobile network over a different communications link (e.g., a WiFi connection, or any other type of secure communications link). Thus, the mobile communications device may transmit the device identification key over a second communications link or channel (i.e., a side channel) to an entity associated with a mobile network (e.g., a mobile network operator). The device identification key may be used to register (or authenticate) the mobile communications device for use with the mobile network (e.g., for use of a first communications link such as a cellular network). Thus, the device identification key generator may be configured to communicate over a first communications link (e.g., via a Wi-Fi network) to send the device identification key and a second communications link (e.g., cellular network or other communications link that is different than the first communications link that is used to provide the device identification key from the device to the network) after the device identification key has been used to authenticate the mobile communications device. Accordingly, the mobile network may download or retrieve the device identification key from the mobile communications device via the side channel (e.g., the WiFi network).

In alternative embodiments, the device identification key that is generated from the base key and the network identification may be combined with an additional value that is received from the network operator of the network. For example, a cryptographic proof may be generated from the device identification key and an additional value received from the network operator. The cryptographic proof may then be transmitted from the device to a network operator of the network to authenticate the device with the network.

Figure 4:
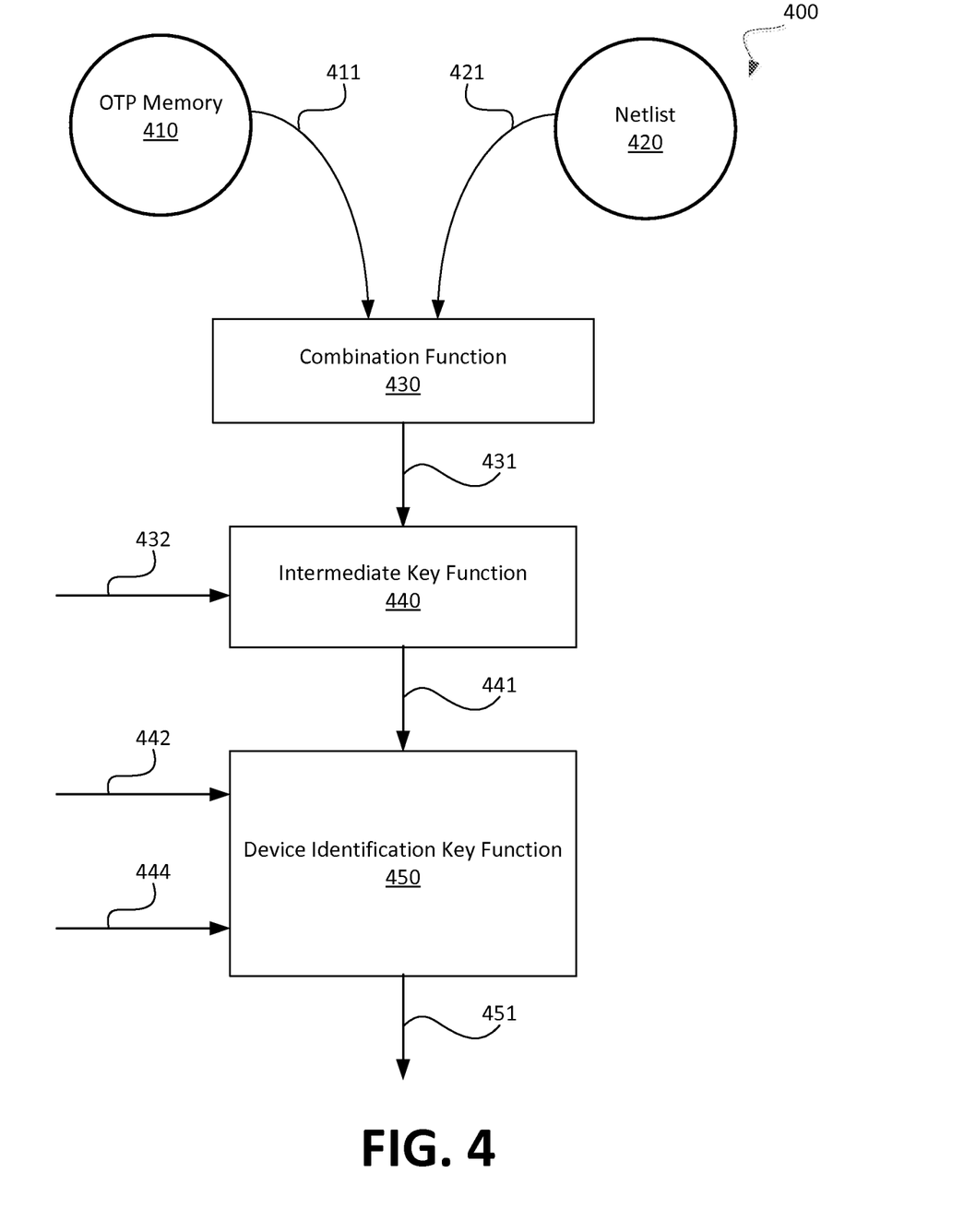
FIG. 4 illustrates an example architecture to generate a device identification key from multiple input values in accordance with some embodiments of the present disclosure.

FIG. 4 illustrates an example architecture 400 to generate a device identification key from multiple input values. In general, the architecture 400 may correspond to the device identification key generator 100 or 200 of FIG. 1 or 2. The architecture 400 may include processing logic that may comprise hardware (e.g., processing device, circuitry, dedicated logic, programmable logic, microcode, hardware of a device, etc.), software (e.g., instructions run or executed on a processing device, embedded software), or a combination thereof. In some embodiments, the architecture 400 may correspond to a hardware root of trust associated with a processing device (e.g., application processor or baseband processor) of a mobile communications device.

As shown in FIG. 4, the architecture 400 may include an OTP memory 410 and a netlist 420. The OTP memory 410 may include a first key split 411 and the netlist 420 may include a second key split 421. Each of the first and second key splits may be used to create a base key. For example, a combination function 430 may receive the first key split 411 and the second key split 421 and may output a base key 431 based on a combination of the first key split 411 and the second key split 421. In alternative embodiments, the base key 431 may be retrieved from the OTP memory 410 or the netlist 420 (e.g., the entire base key 431 is stored in the OTP memory or the netlist). In some embodiments, the base key 431 may be an Advanced Encryption Standard (AES) key or an Elliptic Curve Cryptographic (ECC) key (e.g., the base key is formed by an AES operation or an ECC operation using the key splits). An intermediate key function 440 may receive the base key 431 and a key identification (ID) 432 to generate an intermediate key 441. The key ID 432 may correspond to a function that is to be performed by a device that includes an integrated circuit with the architecture 400. For example, a device storing the base key 431 (or the first and second key splits 411 and 421) may be capable of performing multiple functions or operations such as, but not limited to, authenticating with a network to communicate with another device over the network, encode and/or decode multimedia content (e.g., videos), etc. The key ID 432 may vary based on the function or operation that the device is to perform with the base key 431. For example, the key ID 432 may be at a first value to generate a first intermediate key based on a combination of the first value of the key ID 432 and the base key 431 if the device is to perform a function or operation corresponding to using base key 431 as part of a process to authenticate the device for use with a network. If the device is to perform a function or operation corresponding to the encoding or decoding of multimedia content, then a second intermediate key based on a combination of a second value of the key ID 432 and the base key 431 may be generated. Thus, the key ID 432 may be used to be combined with the base key 431 so that the same base key 431 may be used by different functions or operations performed by the device.

Referring to FIG. 4, a device identification key function 450 may receive the intermediate key 441 as well as various input values such as a cryptographic nonce value 442 and a device ID 444 and may output a device identification key 451. In some embodiments, the device identification key 451 may not be stored in memory. For example, the device identification key 451 may be generated and transmitted, without being storing in memory, for each time that the device is to authenticate with a network. The generated device identification key may be identical for each of the times that the device is to authenticate with the same network. For example, the device identification key 451 may be generated at a particular value in response to a first authentication with a network and, at a later time, the device identification key 451 may be generated at the same particular value in response to a second authentication with the same network. The cryptographic nonce 442 may be an arbitrary number that is used once in a cryptographic operation. In some embodiments, the cryptographic nonce 442 may be a randomly generated number so that the cryptographic nonce 442 is different each time that a device attempts to authenticate with a network. A network identification may be included in the device ID 444 and may correspond to a particular network from multiple networks. For example, the device ID 444 may be a different value or may include a different network ID value for each network that the device is attempting to authenticate with. For example, when the device attempts to authenticate with a first network, then the device identification key 451 may be generated based on a combination of a first network ID and the intermediate key 441 (that is generated from the base key and the key ID). However, if the device attempts to authenticate with a second network, then the device identification key 451 may be generated based on a combination of a second network ID and the intermediate key 441. The device ID 444 may further correspond to identification information of the device. For example, the device ID 444 may include a serial number associated with the device or an International Mobile Subscriber Identity (IMSI) that is used to identify a user of the device (e.g., a mobile communications device) with a network (e.g., a cellular mobile network). Thus, the device ID 444 may include a network identification that is used to route the device identification to the network corresponding to the network identification.

In some embodiments, the combination function 430, intermediate key function 440, and/or the device identification key function 450 may correspond to a cryptographic operation between the received inputs to generate the output value or key. Examples of such cryptographic operations include, but are not limited to, Advanced Encryption Standard (AES) operations, Data Encryption Standard (DES) operations, Triple Data Encryption Standard (3DES) operations, an exlusive-xor (XOR) operation, etc. For example, the output of each function may be a result of an encryption operation between the received inputs.

As such, the device identification key 451 may be generated based on a combination of any or all of a base key, a key ID, a cryptographic nonce, a network ID, and a device ID.

Figure 5:
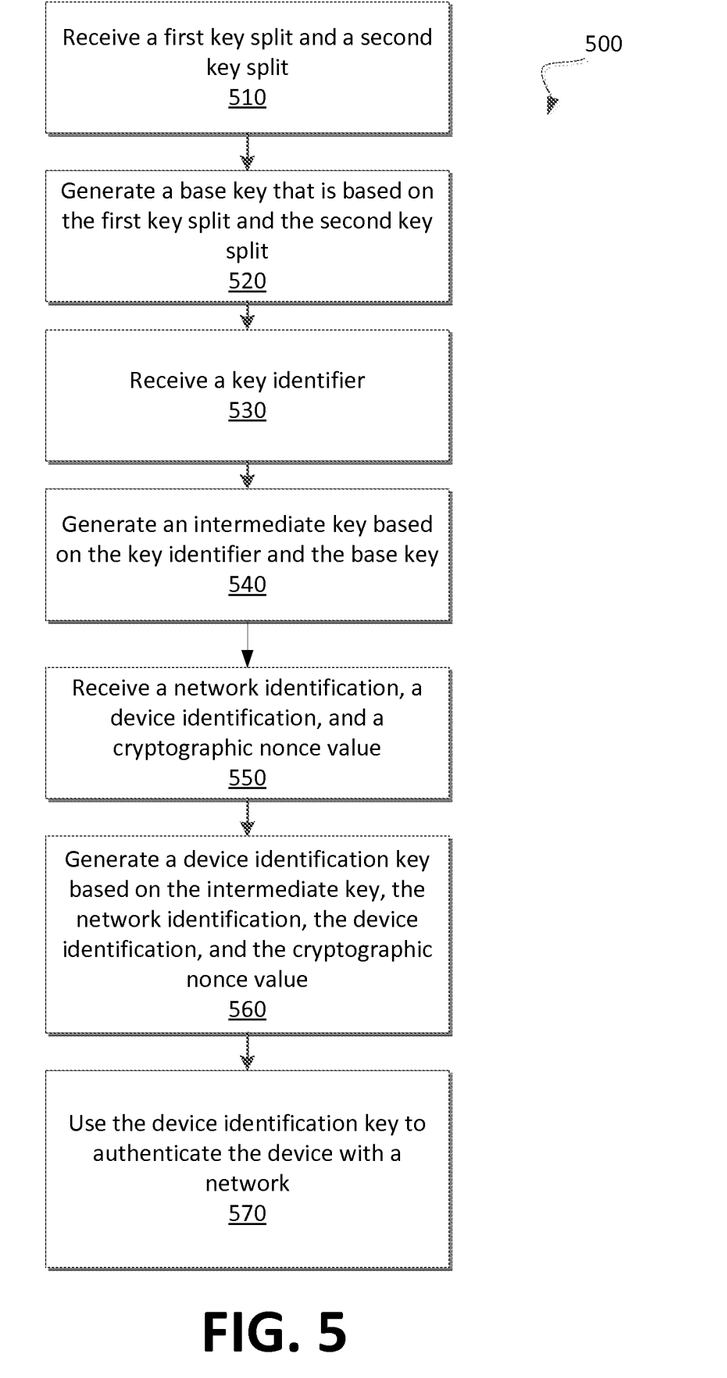
FIG. 5 is a flow diagram of an example method to generate and use a device identification key that is based on multiple input values in accordance with some embodiments.

FIG. 5 is a flow diagram of an example method 500 to generate and use a device identification key that is based on multiple input values. In general, the method 500 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 500 may be performed by the device identification key generator 200 of FIG. 2 or the device identification key generator 110 of FIG. 1.

As shown in FIG. 5, the method 500 may begin with the processing logic receiving a first key split and a second key split (block 510). For example, the first key split may be received from OTP memory and the second key split may be received from a netlist or other memory location within a device. The processing logic may further generate a base key that is based on the first key split and the second key split (block 520). For example, the base key may be generated from an exclusive-or (XOR) operation between the first key split or the second key split. Furthermore, the processing logic may receive a key identifier (block 530). For example, a key identifier corresponding to a function or operation to authenticate the device with a network may be received. The processing logic may further generate an intermediate key based on the key identifier and the base key (block 540). In some embodiments, the intermediate key may be generated from an operation between the key identifier and the base key. The processing logic may receive a network identification, a device identification, and a cryptographic nonce value (block 550). For example, a network identification may be received in response to the device attempting to authenticate with a network, the device identification may be retrieved from a memory of the device, and the cryptographic nonce may be received from a random number generator component of the device.

The processing logic may generate a device identification key based on the intermediate key, the network identification, the device identification, and the cryptographic nonce value (block 560). Additionally, the processing logic may use the device identification key to authenticate the device with a network (block 570). For example, the device identification key may be combined with a random number generated by a network operator of the network (i.e., a network cryptographic challenge) to generate a device proof that is subsequently transmitted to the network. Furthermore, the device identification key may be transmitted to the network (e.g., via the side channel) and may be used to generate a network proof based on a combination of the device identification key received via the side channel and the random number generated by the network operator of the network. In some embodiments, the network may then compare the device proof with a network proof. If the device proof matches the network proof, then the network may successfully authenticate the device so that the device may use the network to communicate with another device. However, if the device proof does not match the network proof, then the network may not successfully authenticate the device so that the device may not use the network to communicate. Further details with regard to using the device identification key in an exchange of data between the device and the network are disclosed in conjunction with FIG. 7.

Figure 6:
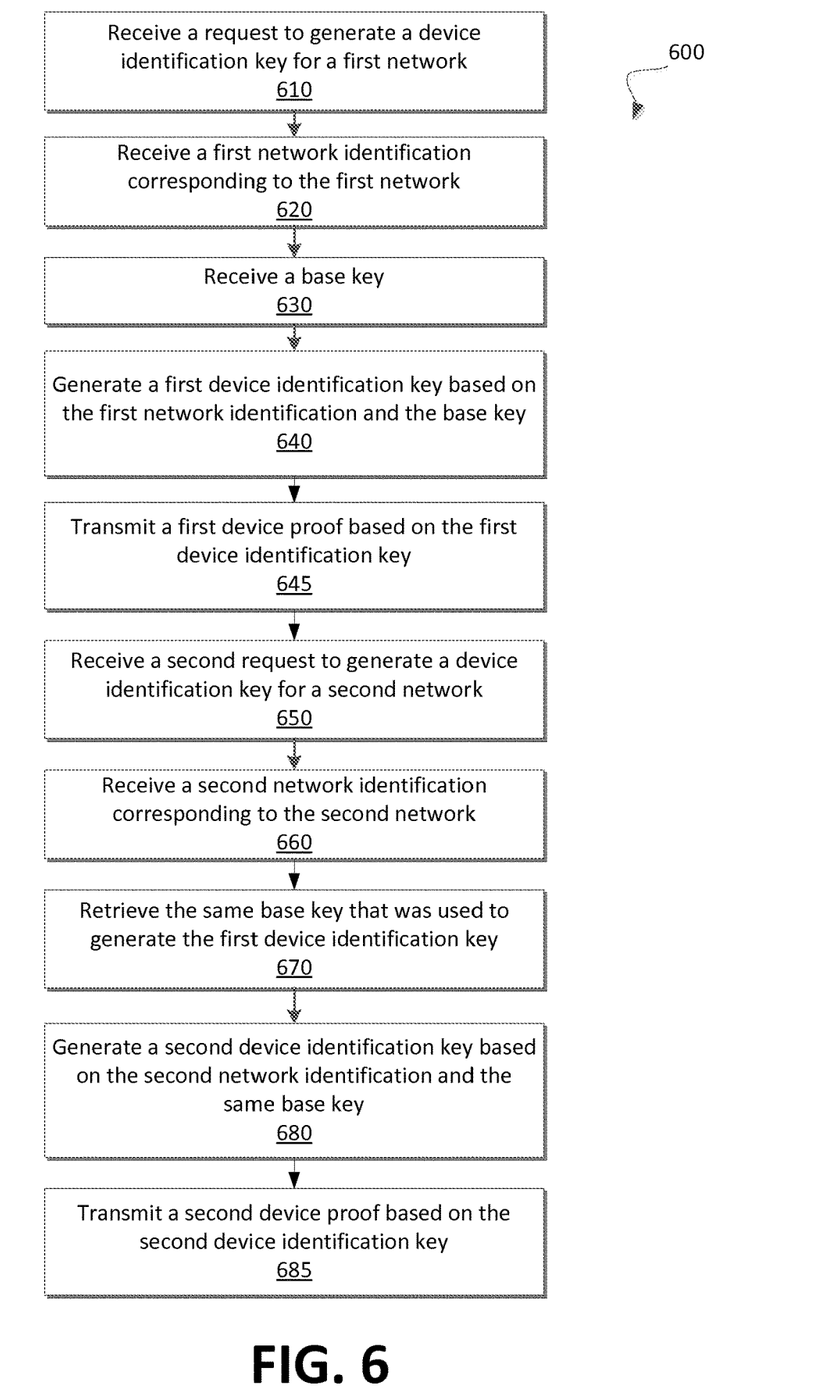
FIG. 6 is a flow diagram of an example method to generate different device identification keys based on different network identifications in accordance with some embodiments.

FIG. 6 is a flow diagram of an example method 600 to generate different device identification keys based on different network identifications. In general, the method 600 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 600 may be performed by the device identification key generator 200 of FIG. 2 or the device identification key generator 110 of FIG. 1.

As shown in FIG. 6, the method 600 may begin with the processing logic receiving a request to generate a device identification key for a first network (block 610). For example, a device may be initialized and attempt to authenticate with the first network to use the first network. The processing logic may receive a first network identification corresponding to the first network (block 620). For example, the first network identification may be retrieved from a memory of the device based on the device attempting to authenticate with the first network. The processing logic may receive a base key (block 630). Furthermore, the processing logic may generate a first device identification key based on the first network identification (block 640). The processing logic may transmit, to the first network, a first device proof that is based on a combination of the first device identification key and challenge information received from the network.

Referring to FIG. 6, the processing logic may subsequently receive a second request to generate a device identification key for a second network (block 650). For example, the device may attempt to authenticate with a different network than the first network. The processing logic may receive a second network identification corresponding to the second network (block 660). Furthermore, the processing logic may retrieve the same base key that was used to generate the first device identification key (block 670). The processing logic may then generate a second device identification key based on the second network identification and the same base key that was used to generate the first device identification key (block 680).

Furthermore, the processing logic may transmit to the second network a second device proof that is based on the second device identification key and additional challenge information that is received from the network (block 685).

Figure 7:
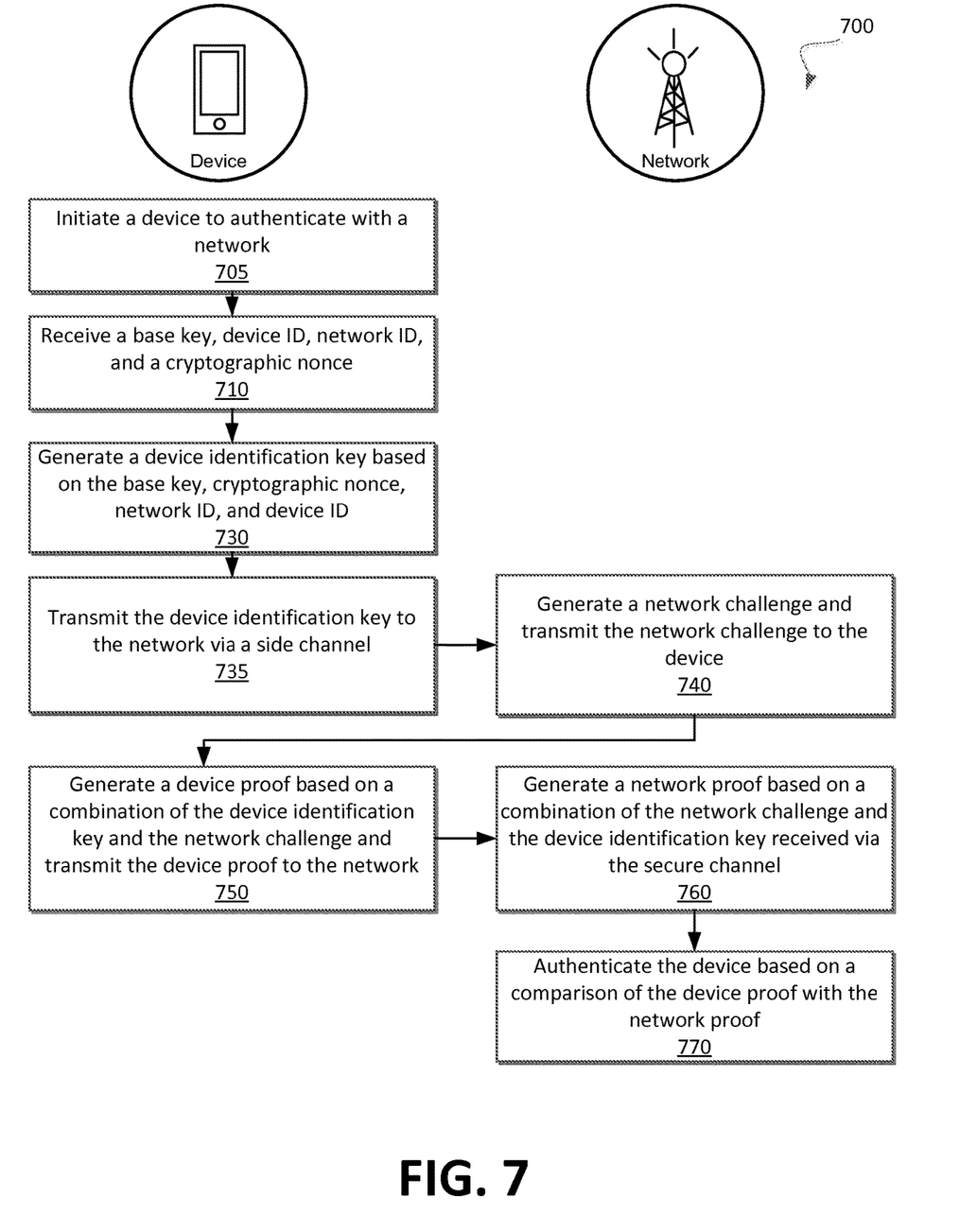
FIG. 7 illustrates an example exchange of data between a device and a network in accordance with some embodiments of the present disclosure.

FIG. 7 illustrates an example exchange 700 of data between a device and a network. In general, the exchange 700 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the exchange 700 may include operations of a device that may be performed by the device identification key generator 200 of FIG. 2 or the device identification key generator 110 of FIG. 1.

As shown in FIG. 7, the exchange 700 may begin with a device initiating to authenticate with a network (block 705). The device may further receive information including a device ID, network ID, a base key, and a cryptographic nonce (block 710). The information may be received from a memory of the device. The device may further generate a device identification key based on the base key, the cryptographic nonce, the network ID, and the device ID (block 730). The device may further transmit the device identification key to the network via a side channel (block 735). Subsequently, the network may generate a network challenge and transmit the network challenge to the device (block 740). In some embodiments, the network challenge may be a randomly generated number. For example, the network challenge may be randomly generated each time that the device attempts to authenticate with the network. The device may subsequently generate a device proof that is based on the device identification key generated by the device (e.g., as described with regard to FIG. 4 or 5) and the network challenge and the device proof may be transmitted to the network (block 750). The network may generate a network proof that is based on a combination of the device identification key that has been received via the side channel and the network challenge that was previously transmitted to the device (block 760). Furthermore, the network may authenticate the device based on a comparison of the device proof with the network proof (block 770). If the device proof matches the network proof, then the device may be considered to be authenticated by the network. However, if the device proof does not match the network proof, then the device may not be considered to be authenticated by the network.

As described above, the network may authenticate the device. However, in alternative embodiments, the device may authenticate the network and/or each of the device and the network may authorize each other (i.e., mutual authentication). For example, to authenticate the network with the device, the device may transmit a device challenge to the network after transmitting the device identification key via the side channel to the network. The network may generate a network proof based on a combination of the device identification key and the device challenge. Furthermore, the network may transmit the network proof to the device and the device may generate a device proof that is based on a combination of the device challenge and the generated device identification key. If the network proof matches the device proof, then the network may be considered to be authenticated by the device. However, if the network proof does not match the device proof, then the network may not be considered to be authenticated by the device.

Figure 8:
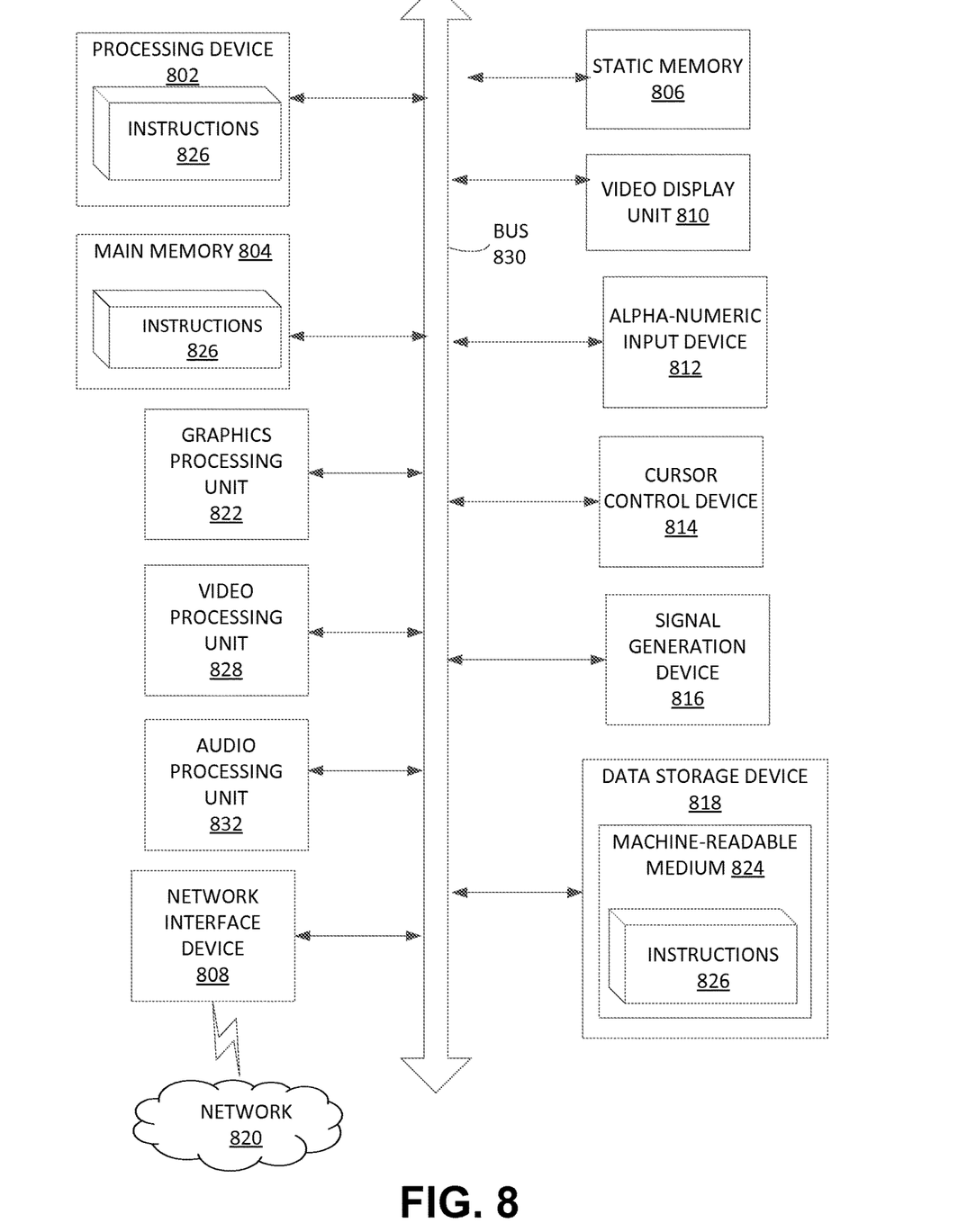
FIG. 8 illustrates a block diagram of an embodiment of a computer system in which some embodiments of the disclosure may operate.

FIG. 8 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet via a network 820. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system includes a processing device 802, a main memory 804 (e.g., read-only memory (ROM), flash memory, dynamic random access memory (DRAM) such as synchronous DRAM (SDRAM) or DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computer system may further include a network interface device 808. The computer system also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a video processing unit 828, an audio processing unit 832, and a signal generation device 816 (e.g., a speaker).

The data storage device 818 may include a machine-readable storage medium 824 (also known as a computer-readable medium) on which is stored one or more sets of instructions or software 826 embodying any one or more of the methodologies or functions described herein. The instructions 826 may also reside, completely or at least partially, within the main memory 804 and/or within the processing device 802 during execution thereof by the computer system, the main memory 804 and the processing device 802 also constituting machine-readable storage media.

In one implementation, the instructions 826 include instructions to implement functionality corresponding to a device identification key generator (e.g., device identification key generator 200 of FIG. 2 or device identification key generator 110 of FIG. 1). While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving a base key being stored at a device;
determining a mobile communications network with which the device is to connect;
receiving a mobile communications network identification of the mobile communications network from a plurality of available mobile communications network identifications that are stored at the device;
identifying a value corresponding to an identification of a function to be performed by the device;
generating, by a processing device, a device identification key based on a combination of the mobile communications network identification, the base key, and the value corresponding to the identification of the function to be performed by the device; and
using the device identification key to authenticate the device with a mobile communications network corresponding to the mobile communications network identification.

2. The method of claim 1, wherein the using of the device identification key to authenticate the device with the mobile communications network corresponding to the mobile communications network identification comprises:
generating a device proof based on a combination of the device identification key and a value received from the mobile communications network corresponding to the mobile communications network identification; and
transmitting the device proof to the mobile communications network corresponding to the mobile communications network identification.

3. The method of claim 1, further comprising:
receiving a cryptographic nonce value; and
receiving a device identification, wherein the generating of the device identification key is further based on the device identification and the cryptographic nonce value.

4. The method of claim 1, further comprising:
transmitting the device identification key from the device to the mobile communications network via a side channel, wherein the device identification key is used by the mobile communications network to generate a mobile communications network proof that is compared with a device proof that is transmitted from the device to the mobile communications network.

5. The method of claim 1, further comprising:
in response to a request to authenticate the device with a second mobile communications network, receiving a second mobile communications network identification corresponding to the second mobile communications network;
generating a second device identification key based on a combination of the second mobile communications network identification and the same base key that is used to generate the first device identification key; and
using the second device identification key to authenticate the device with the second mobile communications network corresponding to the second mobile communications network identification.

6. The method of claim 1, wherein the device identification key is associated with a subscriber identity module (SIM) functionality.

7. The method of claim 1, wherein the device identification key is not stored in memory.

8. A system comprising:
a memory to store a base key; and
a processing device coupled with the memory to:
retrieve the base key being stored at the memory;
identify a value corresponding to an identification of a function to be performed by a device;
determine a mobile communications network with which the device is to connect;
receive an identification of the mobile communications network from a plurality of available identifications of mobile communications networks that are stored at the device; and
generate a device key based on the base key, the identification of the mobile communications network, and the value corresponding to the identification of the function to be performed by the device, wherein the device key is associated with authenticating the device for use with the mobile communications network.

9. The system of claim 8, wherein the generating of the device key based on the base key and the identification of the mobile communications network comprises:
generating a device proof based on a combination of the device key and a value received from the mobile communications network; and
transmitting the device proof to the mobile communications network.

10. The system of claim 8, wherein the processing device is further to:
receive a nonce value; and
receive an identification of the device, wherein the generating of the device key is further based on the identification of the device and the nonce value.

11. The system of claim 8, wherein the processing device is further to:
transmit the device key from the device to the mobile communications network via a side channel, wherein the device key is used by the mobile communications network to generate a mobile communications network proof that is compared with a device proof that is transmitted from the device to the mobile communications network.

12. The system of claim 8, wherein the processing device is further to:
transmit the device key from the device to the mobile communications network via a side channel;
receive, from the mobile communications network, a mobile communications network proof based on the transmitted device key, wherein the mobile communications network proof is compared with a device proof generated by the device to authenticate the mobile communications network.

13. The system of claim 8, wherein the processing device is further to:
in response to a request to authenticate the device for use with an additional mobile communications network, receive an identification of the additional mobile communications network;
generate an additional device key based on a combination of the identification of the additional mobile communications network and the same base key that is used to generate the device key; and
use the additional device key to authenticate the device for use with the additional mobile communications network.

14. The system of claim 8, wherein the device key is associated with a subscriber identity module (SIM) functionality.

15. The system of claim 8, wherein the device key is not stored in memory.

16. A non-transitory computer readable medium including data that, when accessed by a processing device, cause the processing device to perform operations comprising:
receiving a base key being stored at a device;
determining a mobile communications network with which the device is to connect;
receiving a mobile communications network identification of the mobile communications network from a plurality of available mobile communications network identifications that are stored at the device;
identifying a value corresponding to an identification of a function to be performed by the device;
generating a device identification key based on a combination of the mobile communications network identification, the base key, and the value corresponding to the identification of the function to be performed by the device; and
using the device identification key to authenticate the device with a mobile communications network corresponding to the mobile communications network identification.

17. The non-transitory computer readable medium of claim 16, wherein the using of the device identification key to authenticate the device with the mobile communications network corresponding to the mobile communications network identification comprises:
generating a device proof based on a combination of the device identification key and a value received from the mobile communications network corresponding to the mobile communications network identification; and
transmitting the device proof to the mobile communications network corresponding to the mobile communications network identification.

18. The non-transitory computer readable medium of claim 16, the operations further comprising:
receiving a cryptographic nonce value; and
receiving a device identification, wherein the generating of the device identification key is further based on the cryptographic nonce value and the device identification.

19. The non-transitory computer readable medium of claim 16, the operations further comprising:

transmitting the device identification key from the device to the mobile communications network via a side channel, wherein the device identification key is used by the mobile communications network to generate a mobile communications network proof that is compared with a device proof that is transmitted from the device to the mobile communications network.

20. The non-transitory computer readable medium of claim 16, the operations further comprising:

in response to a request to authenticate the device with a second mobile communications network, receiving a second mobile communications network identification corresponding to the second mobile communications network;

generating a second device identification key based on a combination of the second mobile communications network identification and the same base key that is used to generate the first device identification key; and using the second device identification key to authenticate the device with the second mobile communications network corresponding to the second mobile communications network identification.

* * * * *